May 28, 1935.  H. L. BONE  2,003,034
FLUID PRESSURE DISTRIBUTION SYSTEM
Filed Oct. 25, 1932   2 Sheets-Sheet 2

Fig. 2.

INVENTOR
Herbert L. Bone.
BY
HIS ATTORNEY

Patented May 28, 1935

2,003,034

UNITED STATES PATENT OFFICE 2,003,034

FLUID PRESSURE DISTRIBUTION SYSTEM

Herbert L. Bone, Swissvale, Pa., assignor to The Union Switch & Signal Company, Swissvale, Pa., a corporation of Pennsylvania Application October 25, 1932, Serial No. 639,434

56 Claims. (Cl. 303—20)

My invention relates to fluid pressure distribution systems, and particularly to fluid pressure distribution systems for classification car retarder yards of the type in which the track switches and the car retarders are both operated by fluid pressure.

Heretofore in car retarder yards of the type described, the fluid for operating both the car retarders and the track switches has been supplied from a single distribution system in which the fluid pressure was maintained at the highest pressure necessary to obtain the maximum retarding force which it was desired to have the car retarders exert, and any retarding forces less than the maximum was obtained by cutting off the supply of fluid to the car retarder operating motor or motors by suitable valve mechanism when the pressure in the operating motor or motors had reached a value corresponding to the desired retarding force. If the pressure of the fluid in the operating motor or motors increased above the value necessary to cause the desired retarding force, the excess fluid was vented to atmosphere. Furthermore, if it was desired to reduce the pressure of the fluid in the operating motor or motors in order to decrease the retarding force, or to release the retarder, or for any other reason, all of the fluid in the operating motor or motors was vented to atmosphere.

In accordance with my present invention it is proposed to save fluid pressure by providing two fluid pressure distribution systems, in one of which the fluid will be maintained at the customary pressure which is usually approximately 100 pounds per square inch, and in the other of which the fluid will be maintained at a pressure of approximately one-half the customary pressure, or 50 pounds per square inch. It is further proposed to supply the fluid to the car retarder operating motor or motors from the low pressure system whenever this pressure is high enough to give the desired braking force, and from the high pressure system only after the pressure in the operating motor or motors has first been built up to approximately the pressure of the fluid in the low pressure system from the low pressure system and still higher braking forces are desired. When the pressure in the car retarder operating motor or motors is to be reduced, the excess pressure will be vented into the low pressure system if the pressure in the motors then exceeds that of the low pressure system, and fluid will be exhausted to atmosphere only when the pressure of the fluid in the operating motor or motors is to be reduced below that of the low pressure system. It is further proposed to operate the switch movements on the fluid from the low pressure system, suitable switch movements recently having been developed for this purpose.

One of the principal objects of my invention is to provide control apparatus which will enable the fluid to be conveniently supplied to, and exhausted from, the car retarder operating motor or motors in the manner outlined above.

Other objects of my invention will appear as the description proceeds.

In the accompanying drawings.

Similar reference characters refer to similar parts in each of the several views.

Figure 1:
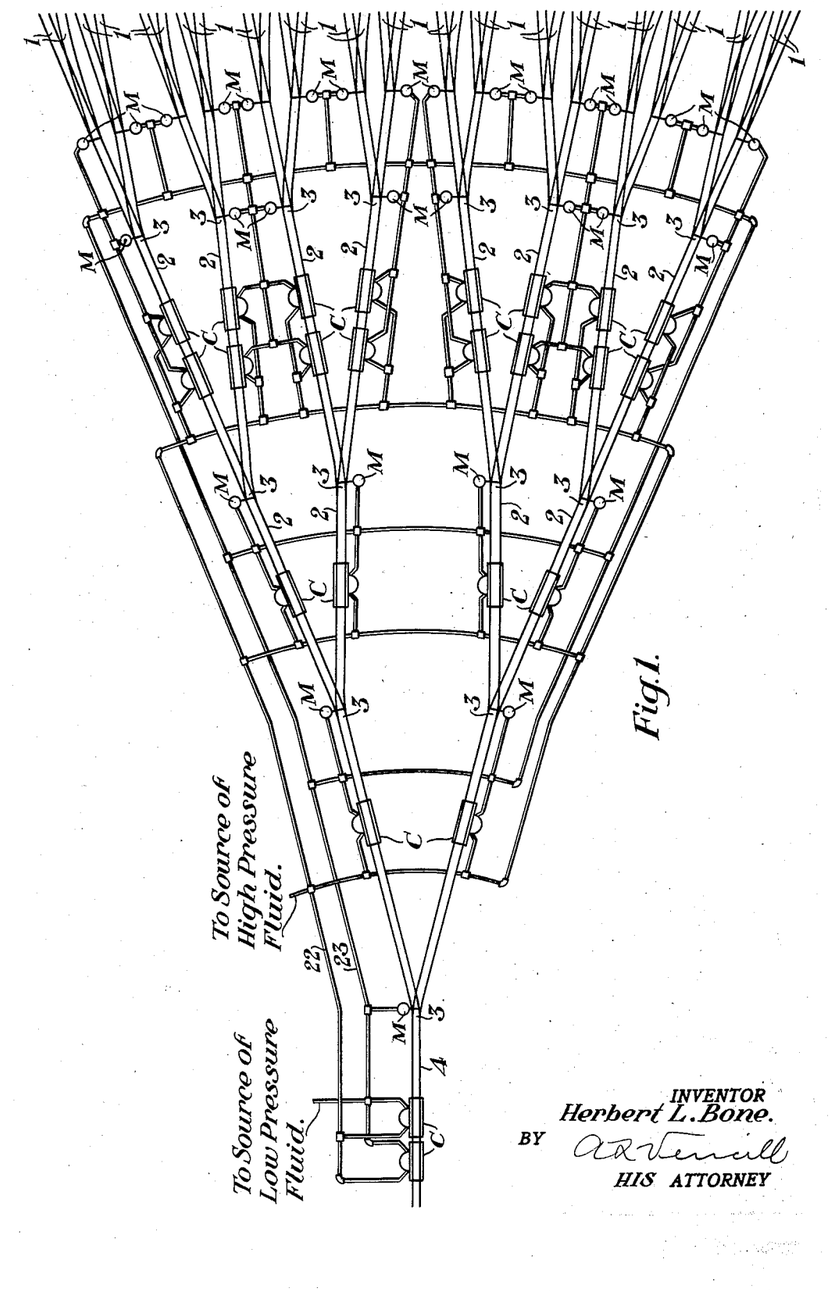
Fig. 1 is a diagrammatic view showing a typical classification car retarder yard provided with one form of fluid pressure distribution system embodying my invention.

Referring first to Fig. 1, the typical car retarder yard layout which I have here shown for the purpose of illustrating my invention comprises a plurality of classification tracks 1 arranged in eight groups of four tracks each and each connected by means of a suitable number of lead tracks 2 and the necessary track switches 3, with a main track 4 which extends over an incline or "hump", this hump not being shown in the drawing because it forms no part of my present invention. Each of the track switches 3 is intended to be operated by a suitable fluid pressure actuated switch operating mechanism indicated diagrammatically in the drawing by a circle, and designated by the reference character M. These switch operating mechanisms may be of any suitable type, one type of switch operating mechanism which is suitable for this purpose being shown in Letters Patent of the United States No. 1,202,164, granted to J. P. Coleman on Oct. 24, 1916, for Railway traffic controlling apparatus.

Associated with the main track 4 and with each of the lead tracks 2 is one or more car retarders, each indicated diagrammatically in the drawings by a rectangle with a semicircle at one side thereof, and each designated by the reference character C. These car retarders may be of any desired type as long as they are fluid pressure operated, but apparatus embodying my invention is particularly suitable for use in connection with car retarders of the type which is shown in Fig. 2, and which I will now describe.

Figure 2:
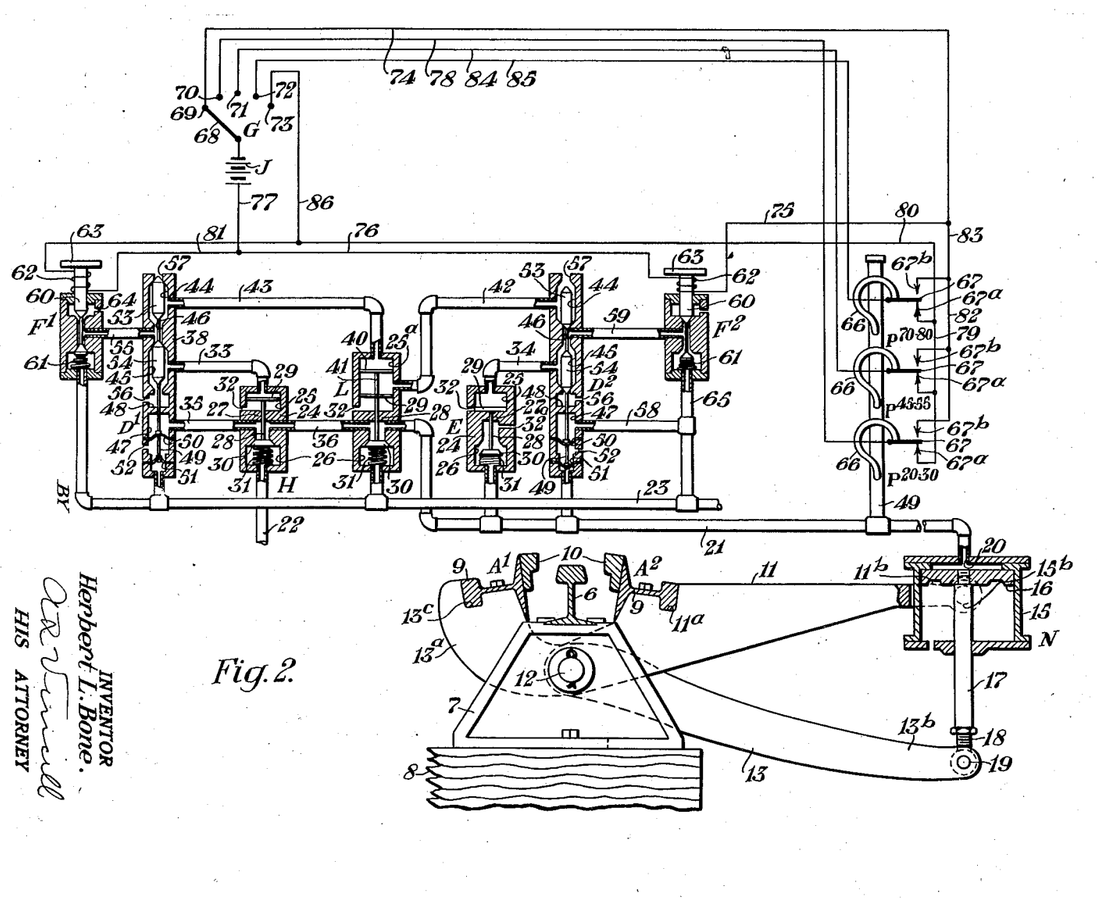
Fig. 2 is a diagrammatic view showing one form of control apparatus for use in connection with the system shown in Fig. 1.

Referring to Fig. 2, the car retarder here shown is similar to that shown and described in detail in my copending application for Letters Patent of the United States, Serial No. 516,883, filed on Feb. 19, 1931, for Railway braking apparatus, and comprises, briefly, two braking bars $A^1$ and $A^2$ located on opposite sides of one track rail 6 of a stretch of railway track, which track rail, as here shown, is secured to a rail support 7 mounted on an adjacent pair of the usual crossties 8, only one crosstie being visible in the drawings. Each of the braking bars $A^1$ and $A^2$ comprises, as usual, a brake beam 9 and a brake shoe 10.

The braking bars $A^1$ and $A^2$ are arranged to be moved toward or away from the rail 6 through the medium of a lever 11 which is pivotally supported at one end of a pivot pin 12 carried by the rail support 7, and a lever 13 which is pivotally supported intermediate its ends on the pivot pin 12. The lever 11 is inclined upwardly and extends away from the rail 6, and is provided in its upper surface with a groove $11^a$ which receives the braking bar $A^2$. The one end $13^a$ of the lever 13 is likewise inclined upwardly and extends away from the rail 6 at the opposite side of the rail from the lever 11, and the other end $13^b$ of the lever 13 is inclined downwardly and extends away from the rail 6 below the lever 11. The end $13^a$ is provided in its upper surface with a groove $13^c$, similar to the groove $11^a$ in the lever 11, which groove receives the braking bar $A^1$. The parts are so arranged and so proportioned that if the outer or free ends of the levers 11 and 13 are moved apart, the braking bars will be moved toward the rail into their effective or braking positions. When the braking bars occupy their braking positions, the brake shoes 10 will engage the opposite side faces of a car wheel traversing rail 6 and will retard the speed of the car. The center of gravity of the lever 11 and braking bar $A^2$ is considerably to the right of the pivot pin 12 so that this lever will normally tend to rotate in a clockwise direction about the pivot pin. Similarly, the center of gravity of the lever 13 and braking bar $A^2$ is to the left of pivot pin 12, so that this lever will normally tend to rotate in a counterclockwise direction about the pivot pin. It will be apparent, therefore, that when no force is applied to the free ends of the levers 11 and 13 to move them apart, the free ends of these levers will move toward each other, thereby moving the braking bars to their ineffective or non-braking positions in which they are illustrated in the drawings.

The levers 11 and 13 are moved apart to move the braking bars to their braking positions by means of a fluid pressure motor N comprising a cylinder 15 containing a reciprocable piston 16 which drives a piston rod 17. The cylinder 15 is pivotally connected with the free end of the lever 11 by means of trunnions $15^b$ formed on the side of the cylinder and extending through bifurcations $11^b$ formed on the lever 11, while the piston rod 17 is connected at its free end with the free end $13^b$ of the lever 13 by means of an adjustable eyebolt 18 and a pivot pin 19. Fluid pressure may be admitted to the cylinder 15 between the upper end of the cylinder and the piston 16 through an opening 20 which is threaded to receive a pipe 21. When fluid pressure is admitted to the cylinder 15 through the pipe 21 and opening 20, the piston 16 will be forced downwardly and the cylinder 15 upwardly, thereby separating the levers 11 and 13 and hence moving the braking bars toward their effective or braking positions, it being obvious that when the braking bars are moved to their braking positions, they will exert a braking force which is proportional to the pressure of the fluid supplied to the cylinder to move them there.

It should be pointed out that while I have shown only one operating unit for the braking bars $A^1$ and $A^2$ in the drawing, in practice these braking bars are provided with a plurality of other similar units, disposed at spaced intervals along the bars, substantially as shown in my copending application Serial No. 516,883, referred to above. It should also be pointed out that, as a general rule, each car retarder will consist not only of braking bars associated with one track rail, but also of other braking bars associated with the opposite rail as well, the length of the braking bars associated with both rails being determined by the speed and the weight of the cars to be retarded, the lengths of the cars, the number of wheels on the cars, etc.

As was previously pointed out, it is proposed in accordance with my present invention to supply the fluid for operating the car retarder motors from both a relatively high pressure distribution system and a relatively low pressure distribution system, and to supply the fluid for operating the switch mechanisms from the low pressure distribution system only. For this purpose, high pressure fluid is piped to each of the car retarders by means of suitable piping designated by the reference character 22, and low pressure fluid is piped to each of the car retarders and to each of the switch movements by suitable piping designated by the reference character 23. In this connection, it is to be understood that there will be reservoirs (not shown) located at each of the car retarders and switch mechanisms to supplement the volume of the piping, as is customary in pneumatic installations. The fluid in the high pressure system may be maintained at any desired pressure by any suitable means forming no part of my invention and therefore not shown in the drawing, the only essential requirement being that the pressure of the fluid be high enough to cause the car retarders to exert the maximum desired retarding force. For most purposes, a pressure of between 100 and 110 pounds per square inch in the high pressure system has been found satisfactory, and for purposes of illustrating by invention, I will assume that the fluid in the high pressure system is maintained at this pressure. The fluid in the low pressure system will preferably be maintained at approximately half of the pressure in the high pressure system, or between 50 and 60 pounds per square inch, and may be supplied from the high pressure system by means of suitable reduction valves not shown, or in any other suitable manner. If desired, a safety valve not shown may be provided to insure that the fluid pressure in the low pressure system will not increase above 60 pounds due to fluid which is supplied to this system by exhausting the excess fluid from the car retarder operating motors into the system in the manner contemplated by my invention, as will be made clear hereinafter.

The supply of fluid pressure from the low pressure distribution system to the switch operating mechanisms is controlled by suitable valve mechanism of well known construction, forming no part of my present invention and therefore not shown. The supply of fluid pressure from the high and low pressure systems to the fluid pressure operating motors of each car retarder, however, is controlled by means of suitable control apparatus embodying my invention, which apparatus I will now describe. Referring again to Fig. 2, this control apparatus comprises three main air valves H, L and E, two pilot valves $F^1$ and $F^2$, and two differential pressure valves $D^1$ and $D^2$.

The main air valves H and E are similar, and each comprises a valve body 24 provided with a piston chamber 25 and a valve chamber 26 separated by a partition 27 through which a valve stem 28 is adapted to slide. The upper end of the valve stem 28 is attached to a piston 29 which is reciprocably mounted in the piston chamber 25, while the lower end of the valve stem has fixed thereto a poppet valve 30 which is adapted to seat against a valve seat provided in the valve chamber 26. A spring 31 is interposed between the poppet valve 30 and the lower end of the valve chamber 26, and biases the poppet valve to the position in which it engages the associated valve seat. The piston chamber 25 of each valve on the lower side of the associated piston 29 is constantly connected with atmosphere by means of a port 32, while the piston chamber 25 of the valve H on the upper side of the associated piston is connected with a pipe 33 leading to the differential pressure valve $D^1$, and the piston chamber 25 of the valve E on the upper side of the piston 29 is connected with a pipe 34 leading to the differential pressure valve $D^2$. The two pipes 33 and 34 serve to conduct fluid to the associated valves for operating these valves under certain conditions which will be described hereinafter. When fluid is supplied to piston chamber 25 of valve H through pipe 33 the piston 29 of this valve moves downwardly, in opposition to the bias of the associated spring 31, thus unseating or opening the associated poppet valve 30, and under these conditions, the piping 22 of the high pressure distribution system is connected with two pipes 35 and 36 so that these pipes are then supplied with fluid from the high pressure distribution system. When the supply of pressure to piston chamber 25 of valve H is cut off, however, and pipe 33 is vented to atmosphere in a manner which will be described more fully hereinafter, the spring 31 reseats or closes the poppet valve 30, and the pipe 22 is then disconnected from the pipes 35 and 36 so that the supply of fluid pressure to the pipes 35 and 36 from the high pressure distribution system is cut off. In similar manner, when fluid pressure is supplied to piston chamber 25 of valve E through pipe 34, piston 29 of this valve moves downwardly and unseats the poppet valve 30 of this valve, thus connecting the pipe 21 which communicates with the cylinders 15 of the operating motors N of the associated car retarder between the upper end of each cylinder and the associated piston 16, with atmosphere through a port 32$^a$, but when the supply of fluid pressure to the piston chamber 25 of the valve E is cut off, and pipe 34 is connected with atmosphere, spring 31 reseats the poppet valve 30, thus disconnecting the pipe 21, and hence the operating motors of the car retarder, from atmosphere.

Valve L is similar to the valves H and E with the exception that the piston chamber of this valve, designated 25$^a$ in the drawings, is made somewhat longer than the corresponding piston chamber 25 of the valves H and E, and contains, in addition to the piston 29, an auxiliary piston 40 which is attached to the upper end of a piston rod 41, the lower end of which piston rod cooperates with the upper side of the piston 29. The region of piston chamber 25$^a$ between the pistons 29 and 40 communicates with a pipe 42 leading to the differential pressure valve $D^2$, while the region of chamber 25$^a$ above piston 40 communicates with a pipe 43 leading to the differential pressure valve $D^1$. It will be seen, therefore, that if fluid pressure is supplied to piston chamber 25$^a$, through pipe 42, piston 29 will be forced downwardly and will unseat the poppet valve 30 of valve L, and that, if fluid pressure is supplied to piston chamber 25$^a$ through pipe 43, piston 40 will then move downwardly, which will, in turn, move piston 29 downwardly to open the poppet valve 30 of valve L. When poppet valve 30 of valve L is unseated, the piping 23 of the low pressure distribution system is connected with the pipes 35 and 21, with the result that fluid is then supplied to the car retarder operating motors from the low pressure distribution system. When the poppet valve 30 of valve L is seated, however, as shown in the drawing, the piping 23 of the low pressure distribution system is disconnected from the pipes 36 and 21, and the supply of fluid pressure to the car retarder operating motors from the low pressure distribution system is then cut off.

The differential pressure valve $D^1$ comprises a valve body 38 provided with two valve chambers 44 and 45 separated by a passageway 46, and a diaphragm chamber 47 separated from the valve chamber 45 by a partition 48 through which a valve stem 49 is adapted to reciprocate. The lower end of the valve stem 49 is fastened to two spaced diaphragms 50 and 51 of different sizes, the diaphragm 50 being larger than the diaphragm 51. The portion of the diaphragm chamber 47 between the two diaphragms 50 and 51 is constantly connected with atmosphere by means of a port 52. The previously mentioned pipe 35 communicates with the portion of the diaphragm chamber 47 above the larger diaphragm 50, and it will be apparent, therefore, that the upper side of the diaphragm 50 is constantly subjected to the pressure in the cylinders of the car retarder operating motors, since the pipe 35 constantly communicates with these cylinders through the valve chamber 26 of valve H, pipe 36, the valve chamber 26 of valve L, and the pipe 21. The portion of the diaphragm chamber 47 below the diaphragm 51 is connected with the piping 23 of the low pressure distribution system, so that the lower side of the diaphragm 51 is constantly subjected to the pressure of the fluid in the low pressure system. As will be seen from an inspection of the drawings, the two diaphragms 50 and 51 are normally bowed upwardly, and the parts are so proportioned that when the net force resulting from the difference between the pressure exerted on diaphragm 50 and the pressure exerted on diaphragm 51 is sufficient to move the diaphragms, they will move with a snap action, and will under no conditions stop in mid stroke. The relative sizes of the two diaphragms 50 and 51 are such that the diaphragms will snap to their lower positions when the pressure in the retarder cylinders reaches a value slightly below that in the low pressure distribution system. It will be apparent, therefore, that the diaphragms will not snap upwardly to their normal positions after they have once been snapped downwardly until the pressure in the retarder cylinders has been reduced a certain amount below that in the low pressure distribution system. For example, assuming that the pressure in the low pressure distribution system is 50 pounds per square inch, the parts will usually be so proportioned that the diaphragms will snap down when the fluid in the retarder operating motors has reached a pressure of about 48 pounds per square inch, and will subsequently remain in their lower positions until the pressure of the fluid in the cylinders of the operating motors has been reduced to approximately 40 pounds per square inch. The upper end of the valve stem 49 carries two double poppet valves 53 and 54 disposed in the two valve chambers 44 and 45, respectively, and each adapted to seat against one or the other of two seats provided in the associated valve chamber. When the diaphragms 50 and 51 occupy their upper or normal positions as shown, the previously mentioned pipe 43 is connected with a pipe 55 leading from the pilot valve $F^1$ and the previously mentioned pipe 33 is connected with atmosphere through a port 56. When the diaphragms 50 and 51 are snapped downwardly, however, the pipe 43 is disconnected from the pipe 55, and is connected with atmosphere through a port 57, while the pipe 33 is disconnected from atmosphere and is connected with pipe 55.

The differential pressure valve $D^2$ is similar in construction to the valve $D^1$ with the exception that the diaphragms 50 and 51 of this valve are normally bowed downwardly and are designed to operate at somewhat different pressures from the pressures at which the valve $D^2$ operates, as I will explain presently. The region of diaphragm chamber 47 of this valve below the diaphragm 51 is connected with the pipe 21, so that the lower side of the diaphragm 51 is constantly subjected to the pressure of the fluid in the cylinders of the car retarder operating motors. The region of diaphragm chamber 47 above the diaphragm 50 is connected with the piping 23 of the low pressure distribution system by means of a pipe 58, and it follows that the upper side of the diaphragm 50 is constantly subjected to the pressure in the low pressure distribution system. The parts are preferably so proportioned that when the pressure in the cylinders of the car retarder operating motors increases to a value which is predetermined amount above that in the low pressure system, the diaphragms 50 and 51 will snap upwardly, and that when the pressure in the retarder cylinders is subquently decreased to a pressure which is slightly more than that in the low pressure system, the diaphragms will snap downwardly to the positions in which they are shown. After the diaphragms have snapped downwardly they will, of course, remain in their lowermost positions until the pressure in the cylinders of the car retarder operating motors is again increased to a value which is high enough to cause them to again snap upwardly. For example, assuming again that the pressure in the low pressure system is 50 pounds per square inch, the parts will usually be so proportioned that the diaphragms 50 and 51 will snap upwardly when the pressure in the cylinders of the car retarder operating motors has increased to 60 pounds per square inch, and will subsequently remain in their upper positions until the pressure in the cylinders of the operating motors has been decreased to 52 pounds per square inch. It is, of course, understood that the specific pressures mentioned in describing the operation of the valves $D^1$ and $D^2$ are not necessarily the exact pressures at which operation of the valves will occur, but are stated for purposes of illustration only. When the diaphragms 50 and 51 of the valve $D^2$ occupy their lower positions as shown, pipe 34 is connected with a pipe 59 leading to pilot valve $F^2$ and pipe 42 is connected with atmosphere through the port 57 of valve $D^2$. When the diaphragms 50 and 51 of valve $D^2$ are snapped upwardly, however, pipe 34 is disconnected from pipe 59 and is connected with atmosphere through port 56, while pipe 42 is disconnected from atmosphere and is connected with pipe 59.

The pilot valves $F^1$ and $F^2$ are similar, and each comprises a valve stem 60 biased to an upper position by means of a spring 61 and provided with a winding 62 and an armature 63. When winding 62 of valve $F^1$ is energized, valve stem 60 moves downwardly in opposition to the bias of spring 61, and under these conditions, the piping 23 of the low pressure system is connected with the pipe 55, but when winding 62 of this valve is deenergized, valve stem 60 is moved to its upper position in which it is shown in the drawings, by means of the spring 61, and pipe 53 is then disconnected from the piping 21 and is connected with atmosphere through a port 64. When winding 62 of valve $F^2$ is energized as shown in the drawings, valve stem 60 of this valve is moved downwardly, and pipe 59 is then connected with the piping 23 of the low pressure distribution system by means of a pipe 65, but when winding 62 of valve $F^2$ is deenergized, valve stem 60 is moved upwardly, thus disconnecting pipe 59 from the piping 23 and connecting pipe 59 with atmosphere through port 64.

It will be apparent from the foregoing, and from an inspection of the drawings, that when winding 62 of valve $F^1$ is energized, so that valve stem 60 is moved downwardly, fluid pressure from the low pressure distribution system will be supplied to the piston chamber $25^a$ of valve L, or the piston chamber 25 of valve H, according as the diaphragms 50 and 51 of valve $D^1$ are then snapped to their upper positions as shown, or are snapped to their lowermost positions, and that the diaphragms 50 and 51 of the valve $D^1$ will be snapped to their upper or lower positions according as the pressure in the cylinders of the car retarder operating motors is below or above the limits of operation previously described for this valve. It will also be apparent that when fluid pressure is supplied to piston chamber 25a of valve L, fluid pressure from the low pressure distribution system will be supplied to the cylinders of the operating motors of the car retarder, and that when fluid pressure is supplied to the piston chamber 25 of valve H, fluid pressure from the high pressure distribution system will be supplied to the cylinders of the operating motors of the car retarder. Likewise, when the winding 62 of valve $F^2$ is energized as shown, so that the valve stem 60 of this valve is moved to its lowermost position, fluid pressure from the low pressure distribution system will be supplied to the piston chamber 25 of the valve E, or the piston chamber $25^a$ of the valve L, according as the diaphragms 50 and 51 of the valve $D^2$ are snapped downwardly as shown, or upwardly, the position of the diaphragms 50 and 51 in turn being determined by the pressure in the cylinders of the car retarder operating motors. It follows that when winding 62 of valve $F^2$ is energized, valve E will open and vent the fluid from the car retarder operating motors to atmosphere, or valve L will open and exhaust the fluid from the operating motors into the low pressure distribution system, according as the pressure of the fluid in the operating motors is above or below the limits of operation previously described for valve $D^2$.

The valves $F^1$ and $F^2$ are controlled in part by a plurality of pressure responsive devices each designated by the reference character P with a suitable distinguishing exponent. Each of these devices comprises a Bourdon tube 66 connected by means of a pipe 49 with pipe 21, and subjected to the pressure in the cylinders of the car retarder operating motors between the upper ends of the cylinders and the associated piston 16. Each Bourdon tube 66 controls two contacts 67—$67^a$ and 67—$67^b$. The devices $P^{20-30}$, $P^{45-55}$ and $P^{70-80}$ are so constructed that they will operate successively as the pressure in car retarder operating motors increases. For example, for all pressures below 20 pounds per square inch, contact 67—$67^a$ of each of these devices is closed. If the pressure exceeds 20 pounds per square inch, however, contact 67—$67^a$ of device $P^{20-30}$ opens, and if the pressure exceeds 30 pounds per square inch, contact 67—$67^b$ of device $P^{20-30}$ closes. In similar manner, the pressure responsive devices $P^{45-55}$ and $P^{70-80}$ are adjusted to open their contacts 67—$67^a$ at 45 and 70 pounds per square inch, respectively, and to close their contacts 67—$67^b$ at 55 and 80 pounds per square inch, respectively. Of course, these specific pressures are not essential, but are only mentioned for purposes of explanation.

The valves $F^1$ and $F^2$ are also controlled by a manually operable circuit controller G having a lever 68 movable into engagement with a selected one of a plurality of fixed contacts 69 to 73, inclusive. The circuit controller G will usually be located at a point remote from the braking apparatus, as in a suitable control cabin, and will be connected with the braking apparatus by means of line wires extending from the control cabin to the braking apparatus.

As shown in the drawings, circuit controller G occupies its "off" position, so that contact 68—69 is closed. A circuit is therefore completed for winding 62 of valve $F^2$, over which current flows from a suitable source here shown as a battery J, through contact 68—69 of circuit controller G, line wire 74, wire 75, winding 62 of valve $F^2$, wire 76, and line wire 77 back to the other terminal of battery J. Valve $F^2$ is therefore energized, as shown, so that valve stem 60 of this valve occupies its lowermost position in which pipe 59 is connected with the low pressure distribution system. Diaphragms 50 and 51 of valve $D^2$ occupy their lowermost positions, and pipe 34 is therefore connected with pipe 59, and hence with the low pressure distribution system, while pipe 42 is vented to atmosphere. Since pipe 34 is connected with the low pressure distribution system, fluid pressure from the low pressure distribution system is supplied to the piston chamber 25 of valve E, thus unseating poppet valve 30, and hence connecting pipe 21 with atmosphere through port $32^a$. It follows, therefore, that the upper ends of the cylinders 15 of the car retarder operating motors are vented to atmosphere, so that the braking bars occupy their ineffective or non-braking positions. It will be noted that since pipe 21 is vented to atmosphere, both the upper and lower sides of diaphragm 51 of valve $D^2$ are subjected to atmospheric pressure. The upper side of diaphragm 50 of valve $D^2$, however, is subjected to the pressure of the fluid in the low pressure distribution system, and it follows, therefore, that the pressure on the upper side of the diaphragm 50 will hold the diaphragms 50 and 51 in their lowermost positions. All circuits for the winding 62 of valve $F^1$ are open, and this winding is therefore deenergized, so that valve stem 60 occupies its upper position. Pipe 55 is therefore connected with atmosphere through the port 64. The region in diaphragm chamber 47 of differential pressure valve $D^1$ above diaphragm 50 is connected to atmosphere through pipe 35, valve chamber 26 of valve H, pipe 36, valve chamber 26 of valve L, pipe 21, and port $32^a$, while the region in valve chamber 47 below diaphragm 51 is supplied with fluid pressure from the low pressure distribution system. The diaphragms 50 and 51 of valve $D^1$ are therefore held in their upper positions, and pipe 33 is therefore connected with atmosphere through port 56 and pipe 43 is connected with pipe 55, and hence with atmosphere. Since pipe 33 is connected with atmosphere, poppet valve 30 of valve H is held closed by spring 31, and the piping of the high pressure distribution system is therefore disconnected from the pipes 35 and 36. Furthermore, since pipe 43 is connected with atmosphere, and since pipe 42 is also connected with atmosphere, poppet valve 30 of valve L is held in its closed position by spring 31, so that the low pressure distribution system is disconnected from the pipes 36 and 21. The contacts 67—$67^a$ of the Bourdon tubes P are all closed, and the contacts 67—$67^b$ are all open.

I will now assume that the operator wishes to cause the car retarder to exert a comparatively light braking force. He therefore moves lever 68 of circuit controller G from the position in which it engages fixed contact 69 to the position in which it engages fixed contact 70, thus opening contact 68—69 and closing contact 68—70. The opening of contact 68—69 deenergizes valve $F^2$, and valve stem 60 of this valve therefore moves to its upper position, thus disconnecting pipe 59 from pipe 65, and connecting pipe 59 with atmosphere. The supply of fluid pressure to piston chamber 25 of valve E is then cut off, and the piston chamber of this valve is vented to atmosphere, so that poppet valve 30 of valve E now closes, thus disconnecting the upper ends of the cylinders of the car retarder operating motors from atmosphere. The closing of contact 68—70 completes a circuit for winding 62 of valve $F^1$, and current flows from battery J through contact 68—70, line wire 78, contact 67—$67^a$ of pressure responsive device $P^{20-30}$, wires 79 and 80, winding 62 of valve $F^1$, wire 81, and line wire 77, back to battery J. The current flowing in this circuit energizes valve $F^1$, and valve stem 60 therefore moves to its lowermost position, thus supplying fluid pressure to piston chamber $25^a$ of valve L from the low pressure supply through valve $F^1$, pipe 55, valve $D^1$, and pipe 43. Piston 40 of valve L is therefore forced to its lowermost position, thus opening poppet valve 30 of this valve, and hence admitting fluid pressure from the low pressure distribution system to the upper ends of the cylinders of the operating motors of the car retarder. When the pressure in the cylinders of the operating motors reaches 20 pounds per square inch, contact 67—$67^a$ of pressure responsive device $P^{20-30}$ opens and interrupts the circuit previously traced for winding 62 of valve $F^1$, thus deenergizing this valve. When valve $F^1$ becomes deenergized, the supply of fluid to piston chamber $25^a$ of valve L is cut off, and the pressure which was previously supplied to this piston chamber is vented to atmosphere through pipe 43, valve $D^1$, pipe 55, valve $F^1$ and port 64. Poppet valve 30 of valve L therefore closes and cuts off the supply of fluid pressure to the cylinders of the car retarder operating motors. If when contact 68—70 of circuit controller G is closed, the pressure in the car retarder operating motors exceeds 30 pounds per square inch for any reason, contact 67—67$^b$ of pressure responsive device P$^{20-30}$ will become closed, which will close another circuit for winding 62 of valve F$^2$, this latter circuit passing from battery J through line wire 78, contact 67—67$^b$ of pressure responsive device P$^{20-30}$, wires 82, 83 and 75, winding 62 of valve F$^2$, wire 76 and line wire 77 back to battery J. Valve F$^2$ will therefore become energized and will cause poppet valve 30 of valve E to open in the manner previously described. When poppet valve 30 of valve E opens, fluid pressure is vented to atmosphere from the operating motors through the port 32$^a$, thus causing the pressure in the motors to decrease. As soon as the pressure decreases below 30 pounds per square inch, contact 67—67$^b$ of pressure responsive device P$^{20-30}$ will again open, and will deenergize valve F$^2$, thereby causing poppet valve 30 of valve E to again become closed and disconnect the operating motors from atmosphere. It will be apparent, therefore, that when lever 68 of circuit controller G occupies the position in which contact 68—70 is closed, a pressure of between 20 and 30 pounds per square inch will be maintained in the cylinders of the car retarder operating motors.

I will next assume that it is desired to cause the braking bars to exert a still higher braking force. The operator will therefore move lever 68 of circuit controller G to the position in which contact 68—71 is closed. Under these conditions, winding 62 of valve F$^1$ becomes energized over another circuit which passes from battery J through contact 68—71 of circuit controller G, line wire 84, contact 67—67$^a$ of pressure responsive device P$^{45-55}$, wires 79 and 80, winding 62 of valve F$^1$, wire 81, and line wire 77 back to battery J. Since the diaphragms 50 and 51 of valve D$^1$ still occupy their upper positions, the energization of valve F$^1$ causes fluid pressure to be admitted to piston chamber 25$^a$ of valve L on the upper side of the piston 40 in the manner previously described, and poppet valve 30 of valve L therefore becomes opened and admits fluid pressure from the low pressure distribution system to the car retarder operating motors. Poppet valve 30 of valve L will now continue to admit fluid to the car retarder operating motors from the low pressure distribution system until the pressure in the car retarder operating motors reaches 45 pounds per square inch at which contact 67—67$^a$ of pressure responsive device P$^{45-55}$ will open and will deenergize valve F$^1$. When this happens, poppet valve 30 of valve L will again become closed in the manner previously described, thus cutting off the supply of fluid pressure from the low pressure distribution system to the car retarder operating motors. If the pressure in the car retarder operating motors increases above 48 pounds per square inch for any reason, the diaphragms 50 and 51 of valve D$^1$ will snap upwardly, but as long as the pressure in the operating motors remains above 48 pounds per square inch and below 55 pounds per square inch, so that contacts 67—67$^a$ and 67—67$^b$ of pressure responsive device P$^{45-55}$ are both open, this operation of the valve D$^1$ will have no effect on the remainder of the apparatus. However, if the pressure in the car retarder motors subsequently decreases below 45 pounds per square inch, so that contact 67—67$^a$ again closes and reenergizes valve F$^1$, the energization of valve F$^1$ will now cause poppet valve 30 of valve H to open and admit fluid pressure to the car retarder operating motors from the high pressure distribution system. It should be pointed out at this point that, if valve D$^1$ has once reversed when contact 68—71 of circuit controller G is closed, it will remain in its reverse position as long as contact 68—71 remains closed, since the pressure in the operating motors is never permitted to decrease far enough below 45 pounds per square inch to cause the valve to return to its normal position, it being remembered that this valve will not return to its normal position until the pressure in the operating motors decreases to 40 pounds per square inch. If the pressure in the car retarder operating motors exceeds 55 pounds per square inch so that contact 67—67$^b$ of pressure responsive device P$^{45-55}$ becomes closed, another circuit for winding 62 of valve F$^2$ will become closed, and current will flow from battery J through contact 68—71 of circuit controller G, line wire 84, contact 67—67$^b$ of pressure responsive device P$^{45-55}$, wires 82, 83 and 75, winding 62 of valve F$^2$, wire 76, and line wire 77 back to battery J. Valve F$^2$ will therefore become energized. When this happens, if the pressure in the car retarder operating motors does not exceed 60 pounds per square inch as will usually be the case, so that the diaphragms of valve D$^2$ still occupy their lower or normal positions, fluid pressure will be admitted to the piston chamber 25 of valve E in the manner previously described. Poppet valve 30 of valve E will therefore become opened, and will exhaust fluid from the car retarder operating motors to atmosphere until the pressure in the motors decreases sufficiently to cause contact 67—67$^b$ of pressure responsive device P$^{45-55}$ to open and deenergize winding 62 of valve F$^2$. If, however, when contact 67—67$^a$ of pressure responsive device P$^{45-55}$ becomes closed and completes the circuit just traced for winding 62 of valve F$^2$, the pressure in the car retarder operating motors should increase to 60 pounds per square inch, so that the diaphragms of valve D$^2$ are moved upwardly, fluid pressure, instead of being admitted to piston chamber 25 of valve E, would be admitted to piston chamber 25$^a$ of valve L between the pistons 40 and 29, and poppet valve 30 of valve L would therefore open. Under these conditions, the excess fluid would be vented into the low pressure distribution system until the pressure in the operating motors had decreased sufficiently to cause contact 67—67$^b$ of pressure responsive device P$^{45-55}$ to open and deenergize valve F$^2$. It will be seen, therefore, that when contact 68—71 of lever L is closed, the pressure in the car retarder operating motors will be maintained at a pressure of between 45 and 55 pounds per square inch.

If the operator desires to cause the car retarder to exert a still higher braking force, he will move lever 68 of circuit controller G to the position in which contact 68—72 is closed. Under these conditions, winding 62 of valve F$^1$ will become energized over a circuit which passes from battery J through contact 68—72, line wire 85, contact 67—67$^a$ of pressure responsive device P$^{70-80}$ wire 80, winding 62 of valve F$^1$, wire 81, and line wire 77 back to battery J. If when winding 62 of valve F$^1$ becomes energized, the diaphragms 50 and 51 of valve D$^1$ still occupy their upper or normal positions, fluid pressure will be admitted to piston chamber 25$^a$ of valve L, and poppet valve 30 of this valve will therefore become opened, and will admit fluid pressure to the operating motors of the car retarder from the low pressure distribution system until the pressure in the low pressure distribution system reaches 48 pounds per square inch, at which time, the diaphragms 50 and 51 of valve $D^1$ will move to their lowermost positions, thus cutting off the supply of fluid pressure to piston chamber 25$^a$ of valve L, and causing fluid pressure to be supplied to piston chamber 25 of valve H. Poppet valve 30 of valve L will therefore become closed, and poppet valve 30 of valve H will become opened. The closing of poppet valve 30 of valve L will cut off the supply of fluid pressure from the low pressure distribution system to the car retarder operating motors, while the opening of poppet valve 30 of valve H will cause fluid from the high pressure distribution system to be supplied to the car retarder operating motors. If when winding 62 of valve $F^1$ becomes energized, the diaphragms 50 and 51 of valve $D^1$, instead of occupying their upper or normal positions as just described, had been previously moved to their lower positions, fluid pressure from the low pressure system would have been supplied to piston chamber 25 of valve H immediately, thus causing fluid from the high pressure distribution system to be initially supplied to the car retarder motors. After poppet valve 30 of valve H has once become opened, it will remain open until the pressure in the operating motors exceeds 70 pounds per square inch, at which time contact 67—67$^a$ of pressure responsive device $P^{70-80}$ will become opened, thus deenergizing winding 62 of valve $F^1$, and hence causing poppet valve 30 of valve H to become closed and cut off the supply of fluid pressure to the car retarder operating motors. If the pressure in the car retarder operating motors now increases to 80 pounds per square inch for any reason, so that contact 67—67$^b$ of pressure responsive device $P^{70-80}$ becomes closed, winding 62 of valve $F^2$ will become energized over still another circuit which passes from battery J through contact 68—72 of circuit controller G, line wire 85, contact 67—67$^b$ of pressure responsive device $P^{70-80}$, wires 83 and 75, winding 62 of valve $F^2$, wire 76, and line wire 77 back to battery J. When winding 62 of valve $F^2$ becomes energized under these conditions, the valve stem 49 of differential pressure valve $D^2$ will occupy its upper position, and fluid pressure will therefore be supplied to piston chamber 25$^a$ of valve L between the pistons 40 and 29, thus causing poppet valve 30 of valve L to become opened. When poppet valve 30 of valve L becomes opened, fluid pressure will be vented from the car retarder operating motors into the low pressure distribution system. Poppet valve 30 of valve L will remain open until the pressure in the operating motors decreases below 80 pounds per square inch at which time contact 67—67$^b$ of pressure responsive device $P^{70-80}$ will open, and will deenergize valve $F^2$, thus cutting off the supply of fluid pressure to piston chamber 25$^a$ of valve L, and venting the piston chamber of valve L to atmosphere, so that poppet valve 30 of valve L will become closed. It follows that when contact 69—72 of circuit controller G is closed, fluid pressure will be supplied to the car retarder operating motors at a pressure of between 70 and 80 pounds per square inch.

If the operator desires to cause the car retarder to exert its maximum braking force, he will move lever 68 to the position in which contact 68—73 is closed. Under these conditions, winding 62 of valve $F^1$ will become energized and will constantly remain energized by virtue of a circuit which passes from battery J through contact 68—73 of circuit controller G, line wire 86, winding 62 of valve $F^1$, wire 81, and line wire 77 back to battery J. When valve $F^1$ becomes energized, if valve $D^1$ occupies the position shown, valve L will initially become operated, and will admit fluid pressure to the car retarder operating motors from the low pressure distribution system until the pressure in the operating motors builds up to 48 pounds per square inch, at which time diaphragms 50 and 51 of valve $D^1$ will move downwardly, thus causing poppet valve 30 of valve L to close and poppet valve 30 of valve H to open. As soon as poppet valve 30 of valve L closes, the supply of fluid pressure to the car retarder operating motors from the low pressure distribution system will then be cut off, and when poppet valve 30 of valve H closes, fluid pressure will then be supplied to the operating motors from the high pressure distribution system. If when valve $F^1$ becomes energized, valve $D^1$ instead of occupying its normal position, occupies its reverse position, poppet valve 30 of valve H will immediately open, and will supply fluid pressure to the car retarder operating motors from the high pressure distribution system. It will be seen, therefore, that when lever 68 of circuit controller G occupies the position in which contact 68—73 is closed, the pressure in the car retarder operating motors will build up to the pressure of the high pressure distribution system.

It should be observed that if the operator moves lever 68 of circuit controller G from a position corresponding to a higher braking force to a position corresponding to a lower braking force, the apparatus will immediately and automatically reduce the braking pressure to the value corresponding to the new position of the lever in a manner which it is believed will be readily understood from the foregoing and from an inspection of the drawings without tracing the sequence of operation in detail.

In order to restore the car retarder to its open or ineffective position, the operator moves lever 68 of circuit controller G to the position in which it is illustrated in the drawings. Under these conditions, if valve $F^1$ is energized, it will become deenergized and valve $F^2$ will become energized over the circuit previously traced including contact 68—69 of lever L. When valve $F^2$ becomes energized, if the pressure in the car retarder operating motors is above 60 pounds per square inch, so that the diaphragms of valve $D^2$ occupy their upper positions, fluid pressure will be supplied to piston chamber 25$^a$ of valve L between the pistons 29 and 40, thus causing poppet valve 30 of valve L to open. When valve 30 opens, since the pressure of the fluid in the car retarder operating motors is above that in the low pressure distribution system, the fluid will be vented into the low pressure distribution system until the pressure has decreased to 52 pounds per square inch. When this happens, the diaphragms of valve $D^2$ will move to their lowermost position, thus cutting off the supply of fluid pressure to the piston chamber 25$^a$ of valve L between the pistons 29 and 40, and venting this region of the piston chamber 25$^a$ to atmosphere. Poppet valve 30 of valve L will therefore now become closed, and will disconnect the operating motors from the low pressure distribution system. The movement of diaphragms 50 and 51 of valve $D^2$ to their lowermost positions also causes fluid pressure to be supplied to piston chamber 25 of valve E, so that this valve now becomes opened and vents fluid from the car retarder operating motors to atmosphere. As the pressure of the fluid in the car retarder operating motors decreases, the braking bars will return to their normal positions by gravity. When the braking bars reach their normal positions, all parts are restored to the positions in which they are shown in the drawings.

One advantage of a fluid pressure distribution system embodying my invention is that it will materially reduce the amount of fluid required for the operation of a car retarder yard by reason of the conservation of fluid which would otherwise be exhausted to atmosphere. This conserved fluid is returned to the low pressure system from which it is used for both the car retarders and the switch movements.

Another advantage of a fluid pressure distribution system embodying my invention is that since the fluid pressure in the low pressure distribution system does not have to be compressed to a pressure as high as is necessary when fluid at only one pressure is provided for operating both car retarders and the switch movements, less energy is required to operate the compressors.

Although I have herein shown and described only one form of fluid pressure distribution systems embodying my invention, it is understood that various changes and modifications may be made therein within the scope of the appended claims without departing from the spirit and scope of my invention.

Having thus described my invention, what I claim is:

1. In combination, a fluid pressure operated device, a first pipe in which fluid is maintained at a relatively low substantially constant pressure, a second pipe in which fluid is maintained at a relatively high substantially constant pressure, means for at times supplying fluid to said device from said first pipe and for at other times supplying fluid to said device from said second pipe, and means for at still other times exhausting fluid from said device into said first pipe or to atmosphere according as the pressure of the fluid in the device is above or below a predetermined pressure which is somewhat higher than the pressure of the fluid in said first pipe.

2. In combination, a fluid pressure operated device, a first pipe in which fluid is maintained at a relatively low substantially constant pressure, a second pipe in which fluid is maintained at a relatively high substantially constant pressure, means for at times supplying fluid to said device from said first pipe and for at other times supplying fluid to said device from said second pipe, and means controlled by the pressure of the fluid in said device for at still other times automatically exhausting fluid from the device into said first pipe or to atmosphere according as the pressure of the fluid in said device is above or below a predetermined pressure which is substantially equal to the pressure of the fluid in said first pipe.

3. In combination, a fluid pressure operated device, a first pipe in which fluid is maintained at a relatively low substantially constant pressure, a second pipe in which fluid is maintained at a relatively high substantially constant pressure, means for at times supplying fluid to said device from said first pipe and for at other times supplying fluid to said device from said second pipe, and means effective when the pressure of the fluid in said device is above the pressure of the fluid in said first pipe for at still other times exhausting fluid from the device into said first pipe until the pressure in the device has decreased substantially to the pressure of fluid in said first pipe and for subsequently venting the fluid from the device to atmosphere.

4. In combination, a fluid pressure operated device, a first pipe in which fluid is maintained at a relatively low substantially constant pressure, a second pipe in which fluid is maintained at a relatively high substantially constant pressure, means for at times supplying fluid to said device from said first pipe and for at other times supplying fluid to said device from said second pipe, and manually controlled means effective when the pressure of the fluid in said device is above the pressure of the fluid in said first pipe for at times exhausting fluid from the device into said first pipe until the pressure of the fluid in the device has decreased substantially to the pressure of the fluid in said first pipe and for subsequently automatically venting the fluid from the device to atmosphere.

5. In combination, a fluid pressure operated device, a first pipe in which fluid is maintained at a relatively low substantially constant pressure, a second pipe in which fluid is maintained at a relatively high substantially constant pressure, means for at times supplying fluid to said device from said first pipe and for at other times supplying fluid to said device from said second pipe, means at times effective when the pressure of the fluid in said device is above the pressure of the fluid in said first pipe for venting the fluid from said device into said first pipe until the pressure of the fluid in the device decreases substantially to the pressure of the fluid in the first pipe, and other means at times effective when the pressure of the fluid in said device is substantially equal to or less than the pressure in said first pipe for venting the fluid from said device to atmosphere.

6. In combination, a fluid pressure operated device, a first pipe in which fluid is maintained at a relatively low substantially constant pressure and a second pipe in which fluid is maintained at a relatively high substantially constant pressure, means for supplying fluid to said device from said first pipe until the pressure of the fluid in said device builds up to substantially the pressure of the fluid in said first pipe and for subsequently automatically supplying fluid to said device from said second pipe, and means at times effective for exhausting fluid from said device into said first pipe or to atmosphere according as the pressure of the fluid in the device is above or below a predetermined pressure which is only a little higher than the pressure of the fluid in said first pipe.

7. In combination, a fluid pressure operated device, a first pipe in which fluid is maintained at a relatively low substantially constant pressure and a second pipe in which fluid is maintained at a relatively high substantially constant pressure, means for supplying fluid to said device from said first pipe until the fluid in said device builds up to substantially the pressure of the fluid in said first pipe and for subsequently automatically supplying fluid to said device from said second pipe, and means effective at times for exhausting fluid from said device into said first pipe until the pressure of the fluid in the device decreases to substantially the pressure of the fluid in said first pipe and for subsequently automatically venting fluid from said device to atmosphere.

8. In combination, a fluid pressure operated device, a first pipe in which fluid is maintained at a relatively low substantially constant pressure and a second pipe in which fluid is maintained at a relatively high substantially constant pressure, means for supplying fluid to said device from said first pipe until the pressure in the device builds up to substantially the pressure of the fluid in said first pipe, means for subsequently supplying fluid to said device from said second pipe, means effective at times when the pressure of the fluid in said device is above the pressure of the fluid in said first pipe for venting the fluid from said device into said first pipe, and other means effective at times when the fluid in said device is substantially equal to or less than the pressure of the fluid in said first pipe for at times venting the fluid from said device to atmosphere.

9. In combination, a fluid pressure motor device, a source of relatively low pressure fluid of substantially constant value, a source of relatively high pressure fluid of substantially constant value, and means for admitting fluid from said low pressure source to said motor device until the pressure in the motor device builds up to approximately the pressure of said low pressure source and for subsequently admitting fluid from said high pressure source to said motor device.

10. In combination, a fluid pressure motor device, a source of relatively low pressure fluid of substantially constant value, a source of relatively high pressure fluid of substantially constant value, and means for admitting fluid from said low pressure source to said motor device until the pressure in the motor device builds up to approximately the pressure of said low pressure source and for subsequently automatically admitting fluid from said high pressure source to said motor device.

11. In combination, a fluid pressure motor, a first pipe in which fluid is maintained at a relatively low substantially constant pressure, a second pipe in which fluid is maintained at a relatively high substantially constant pressure, a first valve for connecting said motor with said first pipe, a second valve for connecting said motor with said second pipe, a third valve for connecting said motor with atmosphere, and means for selectively operating said three valves.

12. In combination, a fluid pressure motor, a first pipe in which fluid is maintained at a relatively low substantially constant pressure, a second pipe in which fluid is maintained at a relatively high substantially constant pressure, means for at times supplying said motor with fluid from said second pipe, a first valve for connecting said fluid pressure motor with said first pipe, a second valve for connecting said motor with atmosphere, and means for selectively operating said valves in accordance with the pressure of the fluid in said motor.

13. In combination, a fluid pressure motor, a source of relatively high pressure fluid, a source of relatively low pressure fluid, a first valve for connecting said motor with said low pressure source, a second valve for connecting said motor with said high pressure source, and means for operating said first or said second valve according as the pressure of the fluid in said motor is below or above a predetermined pressure which is substantially equal to the pressure of said low pressure source.

14. In combination, a fluid pressure motor, a source of relatively high pressure fluid of substantially constant value, a source of relatively low pressure fluid of substantially constant value, a first valve for admitting fluid from said low pressure source to said motor, a second valve for admitting fluid from said high pressure source to said motor, and means for at times operating said two valves in such manner that fluid from said low pressure source will be admitted to said motor until the pressure in the motor builds up to substantially the pressure of said low pressure source after which fluid from said high pressure source will be automatically admitted to said motor.

15. In combination, a fluid pressure motor, a first pipe connected with a source of relatively low pressure fluid and a second pipe connected with a source of relatively high pressure fluid, a first valve for connecting said motor with said second pipe, a second valve for connecting said motor with said first pipe, a third valve for connecting said motor with atmosphere, means for at times selectively operating said first and second valves in accordance with the pressure of the fluid in said motor for supplying fluid to said motor, and means for at other times selectively operating said second and third valves in accordance with the pressure of the fluid in said motor for exhausting fluid from said motor.

16. In combination, a fluid pressure motor, a first pipe in which fluid is maintained at a relatively low substantially constant pressure, a second pipe in which fluid is maintained at a relatively high substantially constant pressure, a first valve for connecting said motor with said first pipe, a second valve for connecting said motor with said second pipe, a third valve for connecting said motor with atmosphere, and means controlled in part by the pressure of the fluid in said motor for selectively operating said three valves.

17. In combination, a fluid pressure motor, a first pipe connected with a source of relatively low pressure fluid, a second pipe connected with a source of relatively high pressure fluid, means for at times supplying fluid from said second pipe to said motor, a first valve for connecting said motor with said first pipe, a second valve for connecting said motor with atmosphere, a third valve responsive to the pressure of the fluid in said motor, and means controlled in part by said third valve for controlling said first and second valves.

18. In combination, a fluid pressure motor, a first pipe in which fluid is maintained at a relatively low substantially constant pressure, a second pipe in which fluid is maintained at a relatively high substantially constant pressure, means for at times supplying fluid from said second pipe to said motor, and means for at other times exhausting fluid from said motor to said first pipe or to atmosphere according as the pressure of the fluid in the motor is above or below a pressure which is substantially equal to the pressure of the fluid in said first pipe.

19. In combination, a fluid pressure motor, a first pipe in which fluid is maintained at a relatively low substantially constant pressure, a second pipe in which fluid is maintained at a relatively high substantially constant pressure, means for at times supplying fluid from said second pipe to said motor, and means for at other times exhausting fluid from said motor to said first pipe until the pressure of the fluid in the motor decreases to substantially the pressure of the fluid in said first pipe and for subsequently automatically venting fluid from said motor to atmosphere.

20. In combination, a fluid pressure motor, a first pipe connected with a source of relatively low pressure fluid, a second pipe connected with a source of relatively high pressure fluid, a first valve for connecting said motor with said first pipe, a second valve for connecting said motor with said second pipe, a third valve responsive to the pressure of the fluid in said motor and having a valve element which is moved to one position or another position according as the pressure of the fluid in said motor increases above one predetermined pressure or decreases below another predetermined pressure which is somewhat less than said one predetermined pressure, and manually controlled means for operating said second valve or said first valve according as the valve element of said third valve occupies said one position or said other position.

21. In combination, a fluid pressure motor, a first pipe connected with a source of relatively low pressure fluid, a second pipe connected with a source of relatively high pressure fluid, a first valve for connecting said motor with said first pipe, a second valve for connecting said motor with said second pipe, a third valve responsive to the pressure of the fluid in said motor and having a valve element which is moved to one position or another position according as the pressure of the fluid in said motor increases above one predetermined pressure which is a little below the pressure of the fluid in said first pipe or decreases below another pressure which is somewhat less than the pressure of the fluid in said first pipe, and manually controlled means for operating said second valve or said first valve according as said valve element occupies said one position or said other position.

22. In combination, a fluid pressure motor, a source of relatively high pressure fluid, a source of relatively low pressure fluid, a first fluid pressure operated valve for connecting said motor with said low pressure source, a second fluid pressure operated valve for connecting said motor with said high pressure source, a magnet valve, means for at times energizing said magnet valve, and means effective when said magnet valve is energized for admitting fluid pressure from one of said sources to said first or said second fluid pressure operated valve according as the pressure of the fluid in said motor is then below or above a predetermined pressure.

23. In combination, a fluid pressure motor, a first pipe connected with a source of relatively low pressure fluid, a second pipe connected with a source of relatively high pressure fluid, a first fluid pressure operated valve for connecting said motor with said first pipe, a second fluid pressure operated valve for connecting said motor with said second pipe, a magnet valve, means for at times energizing said magnet valve, and means effective when said magnet valve is energized for admitting fluid pressure from one of said pipes to said first fluid pressure operated valve until the fluid in said motor builds up to substantially the pressure of the fluid in said first pipe and for subsequently admitting fluid pressure to said second fluid pressure operated valve.

24. In combination, a fluid pressure motor, a first pipe connected with a source of relatively low pressure fluid, a second pipe connected with a source of relatively high pressure fluid, a first fluid pressure operated valve for connecting said motor with said first pipe, a second fluid pressure operated valve for connecting said motor with said second pipe, a magnet valve, a plurality of contacts, means for successively operating said contacts as the pressure in said motor increases, a plurality of circuits for said magnet valve each including a different one of said contacts, and means effective when said magnet valve is energized for admitting fluid pressure from one of said pipes to said first or said second fluid pressure operated valve according as the pressure of the fluid in said motor is then below or above a predetermined pressure.

25. In combination, a fluid pressure motor, a first pipe connected with a source of relatively low pressure fluid, a second pipe connected with a source of relatively high pressure fluid, a first fluid pressure operated valve for connecting said motor with said first pipe, a second fluid pressure operated valve for connecting said motor with said second pipe, a magnet valve, a plurality of contacts, means for successively operating said contacts as the pressure in said motor increases, manually controlled means for energizing said valve over a selected one of said contacts, and means effective when said magnet valve is energized for admitting fluid pressure from one of said pipes to said first or said second fluid pressure operated valve according as the pressure of the fluid in said motor is then below or above a predetermined pressure.

26. In combination, a fluid pressure motor, a source of relatively high pressure fluid, a source of relatively low pressure fluid, a first fluid pressure operated valve for connecting said motor with said low pressure source, a second fluid pressure operated valve for connecting said motor with said high pressure source, a magnet valve, a plurality of contacts, means for successively operating said contacts as the pressure in said motor increases, a circuit controller provided with a contact arm adapted to selectively engage a plurality of fixed contacts, a plurality of circuits for said magnet valve each including a different one of the contacts of said circuit controller and a different one of said plurality of pressure responsive contacts in series, and means effective when said magnet valve is energized for admitting fluid pressure from one of said sources to said first or said second fluid pressure operated valve according as the pressure of the fluid in said motor is then below or above a predetermined pressure.

27. In combination, a fluid pressure motor, a source of relatively high pressure fluid, a source of relatively low pressure fluid, a first fluid pressure operated valve for connecting said motor with said low pressure source, a second fluid pressure operated valve for connecting said motor with said high pressure source, a magnet valve, means for at times energizing said magnet valve, means effective when said magnet valve is energized for admitting fluid pressure from one of said sources to said first or said second fluid pressure operated valve according as the pressure of the fluid in said motor is then below or above a predetermined pressure, and means effective when the pressure in said motor has increased to a predetermined pressure for automatically deenergizing said magnet valve.

28. In combination, a fluid pressure motor, a source of relatively high pressure fluid, a source of relatively low pressure fluid, a first fluid pressure operated valve for connecting said motor with said low pressure source, a second fluid pressure operated valve for connecting said motor with said high pressure source, a magnet valve, means for at times energizing said magnet valve, means effective when said magnet valve is energized for admitting fluid pressure from one of said sources to said first or said second fluid pressure operated valve according as the pressure of the fluid in said motor is then below or above a predetermined pressure, and means effective when the pressure of the fluid in said motor has increased to a predetermined pressure for automatically deenergizing said magnet valve and for subsequently reenergizing said valve if the pressure subsequently decreases below said predetermined pressure.

29. In combination, a fluid pressure motor, a source of relatively high pressure fluid, a source of relatively low pressure fluid, a first fluid pressure responsive valve for connecting said motor with said high pressure source, a second fluid pressure responsive valve for connecting said motor with said low pressure source; a differential pressure valve comprising a valve body provided with a diaphragm chamber containing two diaphragms, the region of said chamber between said two diaphragms being connected with atmosphere and the regions on the other sides of said two diaphragms being connected with said motor and with said low pressure source respectively, and a valve element controlled by said two diaphragms, the parts being so designed and so proportioned that when the pressure in said motor increases to a first pressure which is substantially equal to the pressure of said low pressure source said diaphragms will move said valve element from one position to another position and will subsequently hold said valve element in such other position until the pressure of the fluid in said motor subsequently decreases to a second pressure which is somewhat below said first pressure, and means for supplying fluid pressure from one of said sources to said second valve or said first valve according as the valve element of said differential pressure valve occupies its one or its other position.

30. In combination, a fluid pressure motor, a source of relatively high pressure fluid, a source of relatively low pressure fluid, a first fluid pressure responsive valve for connecting said motor with said high pressure source, a second fluid pressure responsive valve for connecting said motor with said low pressure source, a differential pressure valve comprising a valve body provided with a diaphragm chamber containing two diaphragms, the region of said chamber between said two diaphragms being connected with atmosphere and the regions on the other sides of said two diaphragms being connected with said motor and with said low pressure source respectively, and a valve element controlled by said two diaphragms, the parts being so designed and so proportioned that when the pressure in said motor increases to a first pressure which is substantially equal to the pressure of said low pressure source said diaphragms will move said valve element from one position to another position with a snap action and will subsequently hold said valve element in such other position until the pressure of the fluid in said motor subsequently decreases to a second pressure which is somewhat below said first pressure, a manually controlled magnet valve, and means effective when said magnet valve is energized for supplying fluid pressure from one of said sources to said second valve or said first valve according as the valve element of said differential pressure valve occupies its one or its other position.

31. In combination, a fluid pressure motor, a source of relatively high pressure fluid, a source of relatively low pressure fluid, a first fluid pressure responsive valve for connecting said motor with said high pressure source, a second fluid pressure responsive valve for connecting said motor with said low pressure source; a differential pressure valve comprising a valve body provided with a diaphragm chamber containing two diaphragms, the region of said chamber between said two diaphragms being connected with atmosphere and the regions on the other sides of said two diaphragms being connected with said motor and with said low pressure source respectively, and a valve element controlled by said two diaphragms, the parts being so designed and so proportioned that when the pressure in said motor increases to a first pressure which is substantially equal to the pressure of said low pressure source said diaphragms will move said valve element from one position to another position with a snap action and will subsequently hold said valve element in said other position until the pressure of the fluid in said motor subsequently decreases to a second pressure which is somewhat below said first pressure; a magnet valve, a plurality of contacts, means for successively operating said contacts as the pressure of the fluid in said motor increases, means for energizing said magnet valve over a selected one of said contacts, and means effective when said magnet valve is energized for supplying fluid pressure from one of said sources to said second valve or to said first valve according as the valve element of said differential pressure valve occupies its one or its other position.

32. In combination, a fluid pressure motor, a first pipe connected with a source of relatively low pressure fluid, a second pipe connected with a source of relatively high pressure fluid, means for at times supplying said motor with fluid from said second pipe, a first valve for connecting said motor with said first pipe, a second valve for connecting said motor with atmosphere, a third valve responsive to the pressure of the fluid in said motor and having a valve element which moves from a first position to a second position when the pressure of the fluid in said motor increases to a pressure which is a predetermined amount above the pressure of the low pressure system and subsequently remains in said second position until the pressure in the motor subsequently decreases to substantially the pressure of the low pressure system, and means for operating said first valve or said second valve according as the valve element of said third valve occupies its second or its first position.

33. In combination, a fluid pressure motor, a first pipe connected with a source of relatively low pressure fluid, a second pipe connected with a source of relatively high pressure fluid, means for at times supplying said motor with fluid from said second pipe, a first valve for connecting said motor with said first pipe, a second valve for connecting said motor with atmosphere, a third valve responsive to the pressure of the fluid in said motor and having a valve element which moves from a first position to a second position when the pressure of the fluid in said motor increases to a pressure which is a predetermined amount above the pressure of the low pressure system and subsequently remains in said second position until the pressure in the motor subsequently decreases to substantially the pressure of the low pressure system, a manually controlled magnet valve, and means effective when said magnet valve is energized for operating said first valve or said second valve according as the valve element of said third valve occupies its second or its first position.

34. In combination, a fluid pressure motor, a first pipe connected with a source of relatively low pressure fluid, a second pipe connected with a source of relatively high pressure fluid, means for at times supplying said motor with fluid from said second pipe, a first fluid pressure operated valve for connecting said motor with said first pipe, a second fluid pressure operated valve for connecting said motor with atmosphere, a third valve responsive to the pressure of the fluid in said motor and having a valve element which moves from a first position to a second position when the pressure of the fluid in said motor increases to a pressure which is a predetermined amount above the pressure of the low pressure system and subsequently remains in said second position until the pressure of the fluid in the motor decreases to substantially the pressure of the low pressure system, a magnet valve, means for energizing said magnet valve, and means effective when said magnet valve is energized for admitting fluid pressure from one of said pipes to said first or said second valve according as the valve element of said third valve then occupies its second or its first position.

35. In combination, a fluid pressure motor, a first pipe connected with a source of relatively low pressure fluid, a second pipe connected with a source of relatively high pressure fluid, means for at times supplying said motor with fluid from said second pipe, a first fluid pressure operated valve for connecting said motor with said first pipe, a second fluid pressure operated valve for connecting said motor with atmosphere, a third valve responsive to the pressure of the fluid in said motor and having a valve element which moves from a first position to a second position when the pressure of the fluid in said motor increases to a pressure which is a predetermined amount above the pressure of the low pressure system and subsequently remains in said second position until the pressure of the fluid in the motor decreases to substantially the pressure of the low pressure system, a magnet valve, a series of contacts, means for successively operating said contacts as the pressure of the fluid in said motor increases, means for energizing said magnet valve over a selected one of said contacts, and means effective when said magnet valve is energized for admitting fluid pressure from one of said pipes to said first or said second valve according as the valve element of said third valve occupies its second or its first position.

36. In combination, a fluid pressure motor, a first pipe connected with a source of relatively low pressure fluid, a second pipe connected with a source of relatively high pressure fluid, means for at times supplying said motor with fluid from said second pipe, a first fluid pressure operated valve for connecting said motor with said first pipe, a second fluid pressure operated valve for connecting said motor with atmosphere; a differential pressure valve comprising a valve body provided with a diaphragm chamber containing two diaphragms, the region of said chamber between said diaphragm being connected with atmosphere and the region on the other sides of said two diaphragms being connected with said motor and with said first pipe respectively, and a valve element controlled by said two diaphragms, the parts being so designed and so proportioned that when the pressure of the fluid in said motor increases to a pressure which is a predetermined amount above the pressure of the fluid in said first pipe said diaphragms will move said valve element from a first position to a second position with a snap action and will subsequently hold said valve element in said second position until the pressure of the fluid in said motor decreases to substantially the pressure of the fluid in said first pipe; and means for supplying fluid pressure from one of said pipes to said first or said second valve according as the valve element of said third valve occupies its second or its first position.

37. In combination, a fluid pressure motor, a first pipe connected with a source of relatively low pressure fluid, a second pipe connected with a source of relatively high pressure fluid, means for at times supplying said motor with fluid from said second pipe, a first fluid pressure operated valve for connecting said motor with said first pipe, a second fluid pressure operated valve for connecting said motor with atmosphere; a differential pressure valve comprising a valve body provided with a diaphragm chamber containing two diaphragms, the region of said chamber between said diaphragms being connected with atmosphere and the region on the other sides of said two diaphragms being connected with said motor and with said first pipe respectively, and a valve element controlled by said two diaphragms, the parts being so designed and so proportioned that when the pressure of the fluid in said motor increases to a pressure which is a predetermined amount above the pressure of the fluid in said first pipe said diaphragms will move said valve element from a first position to a second position with a snap action and will subsequently hold said valve element in said second position until the pressure of the fluid in said motor decreases to substantially the pressure of the fluid in said first pipe; a magnet valve, manually controlled means for energizing said magnet valve, and means effective when said magnet valve is energized for supplying fluid pressure from one of said pipes to said first or said second valve according as the valve element of said third valve occupies its second or its first position.

38. In combination, a fluid pressure motor, a first pipe connected with a source of relatively low pressure fluid, a second pipe connected with a source of relatively high pressure fluid, means for at times supplying said motor with fluid from said second pipe, a first fluid pressure operated valve for connecting said motor with said first pipe, a second fluid pressure operated valve for connecting said motor with atmosphere, a differential pressure valve comprising a valve body provided with a diaphragm chamber containing two diaphragms, the region of said chamber between said diaphragms being connected with atmosphere and the regions of said chamber on the other sides of said two diaphragms being connected with said motor and with said first pipe respectively, and a valve element controlled by said two diaphragms, the parts being so designed and so proportioned that when the pressure of the fluid in said motor increases to a pressure which is a predetermined amount above the pressure of the fluid in said first pipe said diaphragms will move said valve element from a first position to a second position with a snap action and will subsequently hold said valve element in said second position until the pressure of the fluid in said motor decreases to substantially the pressure of the fluid in said first pipe, a magnet valve, a series of contacts, means for successively operating said contacts as the pressure of the fluid in said motor increases, manually controlled means for energizing said magnet valve over a selected one of said contacts, and means effective when said magnet valve is energized for supplying fluid pressure from one of said pipes to said first or said second valve according as the valve element of said third valve occupies its second or its first position.

39. In combination, a fluid pressure motor, a first pipe connected with a source of relatively low pressure fluid, a second pipe connected with a source of relatively high pressure fluid, a first fluid pressure operated valve for connecting said motor with said second pipe, a second fluid pressure operated valve for connecting said motor with said first pipe, a third fluid pressure operated valve for connecting said motor with atmosphere, a fourth valve responsive to the pressure of the fluid in said motor and having a valve element which moves from a first position to a second position when the pressure of the fluid in said motor increases to substantially the pressure of the fluid in said first pipe and which subsequently remains in its second position until the pressure of the fluid in said motor decreases to a value which is a predetermined amount below the pressure of the fluid in said first pipe, a fifth valve responsive to the pressure of the fluid in said motor and having a valve element which moves from a first position to a second position when the pressure of the fluid in said motor increases to a pressure which is somewhat higher than the pressure of the fluid in said first pipe and which valve element subsequently remains in its second position until the pressure of the fluid in said motor subsequently decreases to substantially the pressure of the fluid in said first pipe, means for at times supplying fluid from one of said pipes to said first or said second valve according as the valve element of said fourth valve occupies its second or first position, and means for at other times supplying fluid from one of said pipes to said second or said third valves according as the valve element of said fifth valve occupies its second or its first position.

40. In combination, a fluid pressure motor, a first pipe connected with a source of relatively low pressure fluid, a second pipe connected with a source of relatively high pressure fluid, a first fluid pressure operated valve for connecting said motor with said second pipe, a second fluid pressure operated valve for connecting said motor with said first pipe, a third fluid pressure operated valve for connecting said motor with atmosphere, a fourth valve responsive to the pressure of the fluid in said motor and having a valve element which moves from a first position to a second position when the pressure of the fluid in said motor increases to substantially the pressure of the fluid in said first pipe and which subsequently remains in its second position until the pressure of the fluid in said motor decreases to a value which is a predetermined amount below the pressure of the fluid in said first pipe, a fifth valve responsive to the pressure of the fluid in said motor and having a valve element which moves from a first position to a second position when the pressure of the fluid in said motor increases to a pressure which is somewhat higher than the pressure of the fluid in said first pipe and which valve element subsequently remains in its second position until the pressure of the fluid in said motor subsequently decreases to substantially the pressure of the fluid in said first pipe, a first magnet valve, means effective when said first magnet valve is energized for supplying fluid from one of said pipes to said first or said second valve according as the valve element of said fourth valve occupies its second or first position, a second magnet valve, means effective when said second magnet valve is energized for supplying fluid from one of said pipes to said second or said third valve according as the valve element of said fifth valve occupies its second or its first position, and means for selectively energizing said magnet valves.

41. In combination, a fluid pressure motor, a first pipe connected with a source of relatively low pressure fluid, a second pipe connected with a source of relatively high pressure fluid, a first fluid pressure operated valve for connecting said motor with said second pipe, a second fluid pressure operated valve for connecting said motor with said first pipe, a third fluid pressure operated valve for connecting said motor with atmosphere, a fourth valve responsive to the pressure of the fluid in said motor and having a valve element which moves from a first position to a second position when the pressure of the fluid in said motor increases to substantially the pressure of the fluid in said first pipe and which subsequently remains in its second position until the pressure of the fluid in said motor decreases to a value which is a predetermined amount below the pressure of the fluid in said first pipe, a fifth valve responsive to the pressure of the fluid in said motor and having a valve element which moves from a first position to a second position when the pressure of the fluid in said motor increases to a pressure which is somewhat higher than the pressure of the fluid in said first pipe and which valve element subsequently remains in its second position until the pressure of the fluid in said motor subsequently decreases to substantially the pressure of said first pipe, a first magnet valve, means effective when said first magnet valve is energized for supplying fluid from one of said pipes to said first or said second valve according as the valve element of said fourth valve occupies its second or first position, a second magnet valve, means effective when said second magnet valve is energized for supplying fluid from one of said pipes to said second or said third valve according as the valve element of said fifth valve occupies its second or its first position, a first series of pressure responsive contacts, means for operating said contacts in succession as the pressure in said motor increases, a second series of contacts one for each contact of the first series, means for operating each contact of the second series when the pressure in said motor increases to a pressure which is a little higher than the pressure at which the corresponding contact of the first series becomes operated, a plurality of circuits for said first magnet valve each including a different one of the contacts of said first series, and a plurality of circuits for said second magnet valve each including a different contact of the second series.

42. In combination, a fluid pressure motor, a first pipe connected with a source of relatively low pressure fluid, a second pipe connected with a source of relatively high pressure fluid, a first fluid pressure operated valve for connecting said motor with said second pipe, a second fluid pressure operated valve for connecting said motor with said first pipe, a third fluid pressure operated valve for connecting said motor with atmosphere, a fourth valve responsive to the pressure of the fluid in said motor and having a valve element which moves from a first position to a second position when the pressure of the fluid in said motor increases to substantially the pressure of the fluid in said first pipe and which subsequently remains in its second position until the pressure of the fluid in said motor decreases to a value which is a predetermined amount below the pressure of the fluid in said first pipe, a fifth valve responsive to the pressure of the fluid in said motor and having a valve element which moves from a first position to a second position when the pressure of the fluid in said motor increases to a pressure which is somewhat higher than the pressure of the fluid in said first pipe and which valve element subsequently remains in its second position until the pressure of the fluid in said motor subsequently decreases to substantially the pressure of the fluid in said first pipe, a first magnet valve, means effective when said first magnet valve is energized for supplying fluid from one of said pipes to said first or said second valve according as the valve element of said fourth valve occupies its second or first position, a second magnet valve, means effective when said second magnet valve is energized for supplying fluid from one of said pipes to said second or said third valve according as the valve element of said fifth valve occupies its second or its first position, a first series of pressure responsive contacts, means for operating said contacts in succession as the pressure of the fluid in said motor increases, a second series of contacts one for each contact of the first series, means for operating each contact of the second series when the pressure in said motor increases to a pressure which is a little higher than the pressure at which the corresponding contact of the first series becomes operated, a manually operable circuit controller having a lever which is adapted to engage a selected one of a plurality of fixed contacts, a plurality of circuits for said first magnet valve each including a different contact of said circuit controller and a different one of the contacts of said first series, and a plurality of circuits for said second magnet valve each including a different one of the contacts of said second series and a different one of the contacts of said circuit controller.

43. In combination, a fluid pressure motor, a first pipe connected with a source of relatively low pressure fluid, a second pipe connected with a source of relatively high pressure fluid, a first fluid pressure operated valve for connecting said motor with said second pipe, a second fluid pressure operated valve for connecting said motor with said first pipe, a third fluid pressure operated valve for connecting said motor with atmosphere, a fourth valve responsive to the pressure of the fluid in said motor and having a valve element which moves from a first position to a second position when the pressure of the fluid in said motor increases to substantially the pressure of the fluid in said first pipe and which subsequently remains in its second position until the pressure in said motor decreases to a value which is a predetermined amount below the pressure of the fluid in said first pipe, a fifth valve responsive to the pressure of the fluid in said motor and having a valve element which moves from a first position to a second position when the pressure of the fluid in said motor increases to a pressure which is somewhat higher than the pressure of the fluid in said first pipe and which valve element subsequently remains in its second position until the pressure of the fluid in said motor subsequently decreases to substantially the pressure of the fluid in said first pipe, a first magnet valve, means effective when said first magnet valve is energized for supplying fluid from one of said sources to said first or said second valve according as the valve element of said fourth valve occupies its second or first position, a second magnet valve, means effective when said second magnet valve is energized for supplying fluid from one of said sources to said second or said third valve according as the valve element of said fifth valve occupies its second or its first position, a first series of pressure responsive contacts, means for operating said contacts in succession as the pressure in said motor increases, a second series of contacts one for each contact of the first series, means for operating each contact of the second series when the pressure in said motor increases to a pressure which is a little higher than the pressure at which the corresponding contact of the first series becomes operated, a manually operable circuit controller having a lever which is adapted to engage a selected one of a plurality of fixed contacts, a plurality of circuits for said first magnet valve each including a different contact of said circuit controller and a different one of the contacts of said first series, and a plurality of circuits for said second magnet valve each including a different one of the contacts of said second series and the contact of said circuit controller which is included in the circuit for the first magnet valve that the corresponding contact of the first series is included in.

44. In combination, a railway braking bar extending parallel to one rail of a stretch of railway track, a fluid pressure motor operatively connected with said braking bar for moving said braking bar toward the track rail to a braking position, a first pipe connected with a source of relatively low pressure fluid and a second pipe connected with a source of relatively high pressure fluid, a first valve for connecting said motor with said first pipe, a second valve for connecting said motor with said second pipe, a third valve for connecting said motor with atmosphere, means for selectively operating said first and second valves in accordance with the pressure of the fluid in said motor for supplying fluid to said motor, and means for selectively operating said second and third valves in accordance with the pressure of the fluid in said motor for exhausting fluid from said motor.

45. The method of controlling a plurality of fluid pressure operated devices some of which are designed to operate on a variable pressure and the remainder of which are designed to operate on a relatively low pressure, said method consisting in providing a first pipe which is connected with a source of relatively low pressure fluid and a second pipe which is connected with a source of relatively high pressure fluid, supplying fluid to the devices which are designed to operate on a variable pressure from the first pipe as long as this pressure is high enough and from the second pipe only after the pressure in these devices has first been built up to substantially the full pressure of the fluid in the first pipe and higher pressures are desired, exhausting fluid from the devices which are designed to operate on a variable pressure into the first pipe until the pressure of the fluid in these devices is reduced substantially to that of the fluid in the first pipe if the pressure in these devices is above that of the fluid in the first pipe when it is desired to decrease the pressure in these devices and thereafter exhausting the fluid from these devices to atmosphere if further reduction is desired, and supplying the fluid for operating the devices which are designed to operate on a low pressure from the first pipe only.

46. The method of controlling a plurality of fluid pressure operated switches and fluid pressure operated car retarders which consists in providing two fluid distribution systems one of which is connected with a source of relatively high pressure fluid and the other of which is connected with a source of relatively low pressure fluid, supplying fluid to the retarder operating motors from the low pressure system whenever this pressure is high enough and from the high pressure system only after the pressure of the fluid in the operating motors has first been built up to substantially the pressure of the low pressure system from the low pressure system and higher pressures are desired, venting any fluid which is to be exhausted from the car retarder operating motors into the low pressure system until the pressure in the motors decreases to substantially the pressure of the low pressure system if the pressure in the motors is then above that in the low pressure system and to atmosphere when the pressure of the fluid in the motors is below that in the low pressure system, and supplying fluid pressure to the switch operating mechanisms from the low pressure system.

47. In combination, a fluid pressure operated device, a first pipe in which fluid is maintained at a relatively low substantially constant pressure, a second pipe in which fluid is maintained at a relatively high substantially constant pressure, means for selectively connecting said device with said first pipe or said second pipe to admit fluid to said device, and means effective under certain conditions to connect said device with said first pipe for exhausting at least a portion of the fluid in said device into said first pipe.

48. In combination, a fluid pressure operated device, a first pipe connected with a source of relatively low pressure fluid, a second pipe connected with a source of relatively high pressure fluid, manually controlled means for selectively connecting said device with said first or said second pipe to admit fluid pressure to said device, and means effective if the pressure in said device exceeds a predetermined value when said device is connected with said second pipe for automatically disconnecting said device from said second pipe and for subsequently connecting said device with said first pipe to exhaust at least a portion of the fluid in said device into said first pipe.

49. In combination, a first pipe connected with a source of relatively low pressure fluid, a second pipe connected with a source of relatively high pressure fluid, a fluid pressure operated device, a circuit controller comprising a lever having an "off" position and a plurality of "on" positions, means effective when said lever occupies its "off" position for connecting said device with atmosphere, means effective when said lever occupies certain ones of its "on" positions for connecting said device with said first pipe, means effective when said lever occupies other ones of its "on" positions for connecting said device with said second pipe, and means effective if said lever is moved to its "off" position from any one of its "on" positions in which said device is connected with said second pipe for first disconnecting said device from said second pipe and for subsequently connecting said device first with said first pipe and then with atmosphere.

50. In combination, a first pipe connected with a source of relatively low pressure fluid, a second pipe connected with a source of relatively high pressure fluid, a fluid pressure operated device, a circuit controller comprising a lever having an "off" position and a plurality of "on" positions, means effective when said lever occupies its "off" position for connecting said device with atmosphere, means effective when said lever occupies certain ones of its "on" positions for connecting said device with said first pipe, means effective when said lever occupies other ones of its "on" positions for connecting said device with said second pipe, and means effective if said lever is moved to its "off" position from any one of its "on" positions in which said device is connected with said second pipe for first disconnecting said device from said second pipe and for subsequently connecting said device with said first pipe until the pressure of the fluid in said device decreases substantially to the pressure of the fluid in said first pipe and then with atmosphere.

51. In combination, a first pipe connected with a source of relatively low pressure fluid, a second pipe connected with a source of relatively high pressure fluid, a fluid pressure operated device, a manually operated circuit controller comprising a lever having an "off" position in which said device is connected with atmosphere, a plurality of "on" positions in which said device is connected with said first pipe, and a plurality of other "on" positions in which said device is connected with said second pipe, and means effective if said lever is moved from its "off" position past the "on" position in which said device is connected with said first pipe to an "on" position in which said device is connected with said second pipe for first connecting said device with said first pipe until the pressure of the fluid in said device builds up to substantially the pressure of the fluid in said first pipe and for subsequently automatically connecting said device with said second pipe.

52. In combination, a first pipe connected with a source of relatively low pressure fluid, a second pipe connected with a source of relatively high pressure fluid, a fluid pressure operated device, a manually operated circuit controller comprising a lever having an "off" position in which said device is connected with atmosphere, a plurality of "on" positions in which said device is connected with said first pipe, and a plurality of other "on" positions in which said device is connected with said second pipe, means effective if said lever is moved from its "off" position past the "on" positions in which said device is connected with said first pipe to an "on" position in which said device is connected with said second pipe for first connecting said device with said first pipe until the pressure of the fluid in said device builds up to substantially the pressure of the fluid in said first pipe and for subsequently automatically connecting said device with said second pipe, and means effective if said lever is moved from an "on" position in which said device is connected with said second pipe to its "off" position for first disconnecting said device from said second pipe and for subsequently connecting said device with said first pipe until the pressure in said device decreases a predetermined amount and then with atmosphere.

53. In combination, a first pipe in which fluid is maintained at a relatively low substantially constant pressure, a second pipe in which fluid is maintained at a relatively high substantially constant pressure, a first device which is at times supplied with fluid from said second pipe, a second device which is at times supplied with fluid from said first pipe, and means for at times venting fluid from said first device into said first pipe.

54. In combination, a first pipe in which fluid is maintained at a relatively low substantially constant pressure, a second pipe in which fluid is maintained at a relatively high substantially constant pressure, a first device which is at times supplied with fluid from said first pipe and at other times from said second pipe, a second device which is at times supplied with fluid from said first pipe, and means for at times venting fluid from said first device into said first pipe.

55. Railway braking apparatus comprising a braking bar extending parallel to a track rail, a fluid pressure motor for moving said braking bar toward said track rail to a braking position, a first pipe connected with a source of relatively low pressure fluid, a second pipe connected with a source of relatively high pressure fluid; a lever having an "off" position in which said motor is connected with atmosphere and a plurality of "on" positions in which said motor is normally connected with one or the other of said sources depending upon the particular position of the lever, and means effective when said lever is moved from its "off" position to a certain one of its "on" positions for first connecting the motor with the first pipe source for a sufficient time interval to permit the pressure of the fluid in the motor to build up to substantially the pressure of the low pressure source and for subsequently connecting the motor with the second pipe.

56. Railway braking apparatus comprising a braking bar extending parallel to a track rail, a fluid pressure motor for moving said braking bar toward the track rail to a braking position, a first pipe connected with a source of relatively low pressure fluid, a second pipe connected with a source of relatively high pressure fluid; a lever having an "off" position in which said fluid pressure motor is connected with atmosphere, an "on" position in which said fluid pressure motor is normally connected with said first pipe, and an "on" position in which said fluid pressure motor is normally connected with said second pipe, and means controlled by said lever and effective when said lever is moved directly from its "off" position to the "on" position in which said fluid pressure motor is normally connected with said second pipe for initially connecting said motor with said first pipe for a sufficient time interval to permit the pressure of the fluid in the motor to build up to substantially that of the fluid in the first pipe.

HERBERT L. BONE.